United States Patent
Lee et al.

(10) Patent No.: US 7,546,132 B2
(45) Date of Patent: Jun. 9, 2009

(54) COMMUNICATION OF POINT TO MULTIPOINT SERVICE INFORMATION IN WIRELESS COMMUNICATION SYSTEM

(75) Inventors: Young Dae Lee, HaNam-Shi (KR); Sung Duck Chun, Anyang (KR); Seung June Yi, Seoul (KR)

(73) Assignee: LG Electronics, Inc., Seoul (KR)

( * ) Notice: Subject to any disclaimer, the term of this patent is extended or adjusted under 35 U.S.C. 154(b) by 745 days.

(21) Appl. No.: 11/109,192

(22) Filed: Apr. 18, 2005

(65) Prior Publication Data

US 2005/0249141 A1 Nov. 10, 2005

Related U.S. Application Data

(60) Provisional application No. 60/563,869, filed on Apr. 19, 2004.

(51) Int. Cl.
*H04B 7/00* (2006.01)
(52) U.S. Cl. .................................. 455/503; 370/312
(58) Field of Classification Search ............... 455/502, 455/503; 370/310, 312, 329
See application file for complete search history.

(56) References Cited

U.S. PATENT DOCUMENTS

| | | | | |
|---|---|---|---|---|
| 7,197,333 | B2 * | 3/2007 | Hwang et al. | 455/560 |
| 7,336,659 | B2 * | 2/2008 | Meago | 370/390 |
| 7,373,148 | B2 * | 5/2008 | Kim et al. | 455/437 |
| 2002/0128035 | A1 | 9/2002 | Jokinen et al. | |
| 2003/0223394 | A1 | 12/2003 | Parantainen et al. | |
| 2008/0049682 | A1 * | 2/2008 | Ding et al. | 370/335 |

FOREIGN PATENT DOCUMENTS

| | | |
|---|---|---|
| JP | 2002-204204 | 7/2002 |
| JP | 2002-204204 A | 7/2002 |

* cited by examiner

*Primary Examiner*—Raymond S Dean
(74) *Attorney, Agent, or Firm*—Lee, Hong, Degerman, Kang & Waimey

(57) ABSTRACT

The present invention relates to a method for transmitting and receiving information for configuring a point-to-multipoint control channel in a wireless communication system. A network generates configuration information for configuring a point-to-multipoint control channel (MCCH) and transmits the configuration information to a mobile terminal. The configuration information comprises at least one of a modification period, a repetition period, a SFN-MCCH-Offset comprising an offset between a transmission of a first frame of a modification period and a system frame number (SFN) of a cell in which the configuration information is transmitted, and a number of transmission time intervals (TTIs) the mobile terminal will read at each beginning of a repetition period.

28 Claims, 13 Drawing Sheets

COMMUNICATION OF POINT TO MULTIPOINT SERVICE INFORMATION IN WIRELESS COMMUNICATION SYSTEM

CROSS-REFERENCE TO RELATED APPLICATIONS

Pursuant to 35 U.S.C. § 119(e), this application claims the benefit of earlier filing date and right of priority to U.S. Provisional Application No. 60/563,869, filed on Apr. 19, 2004, the contents of which are hereby incorporated by reference herein in its entirety.

BACKGROUND OF THE INVENTION

1. Field of the Invention

The present invention is related to transmitting and receiving point-to-multipoint control information, and more particularly, to transmitting and receiving information for configuring a point-to-multipoint control channel in a wireless communication system.

2. Description of the Related Art

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112,113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

For the purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

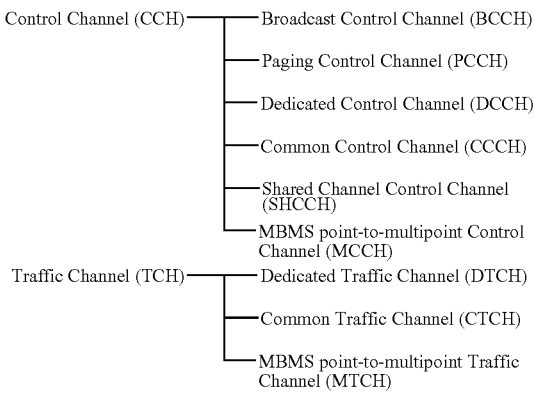

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals, or in the uplink the Radio Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sub-layer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network. Specifically, the core network can only detect the existence of idle mode terminals within a region that is larger than a cell, such as a location or a routing area. Therefore, the existence of idle mode terminals is determined within large regions. In order to receive mobile communication services such as voice or data, the idle mode terminal must move or change into the RRC connected mode. The possible transitions between modes and states are shown in FIG. 5.

A UE in RRC connected mode can be in different states, such as a CELL_FACH state, a CELL_PCH state, a CELL_DCH state or a URA_PCH state. Depending on the states, the UE listens to different channels. For example a UE in CELL_DCH state will try to listen (amongst others) to DCH type of transport channels, which comprises DTCH and DCCH transport channels, and which can be mapped to a certain DPCH. The UE in CELL_FACH state will listen to several FACH transport channels which are mapped to a certain S-CCPCH physical channel. The UE in PCH state will listen to the PICH channel and to the PCH channel, which is mapped to a certain S-CCPCH physical channel.

The UE also carries out different actions depending on the state. For example, based on different conditions, a UE in CELL_FACH will start a CELL Update procedure each time the UE changes from the coverage of one cell into the coverage of another cell. The UE starts the CELL Update procedure by sending to the NodeB a Cell Update message to indicate that the UE has changed its location. The UE will then start listening to the FACH. This procedure is additionally used when the UE comes from any other state to CELL_FACH state and the UE has no C-RNTI available, such as when the UE comes from the CELL_PCH state or CELL_DCH state, or when the UE in CELL_FACH state was out of coverage.

In the CELL_DCH state, the UE is granted dedicated radio resources, and may additionally use shared radio resources. This allows the UE to have a high data rate and efficient data exchange. However, the radio resources are limited. It is the responsibility of the UTRAN to allocate the radio resources amongst the UEs such that they are efficiently used and ensure that the different UEs obtain the quality of service required.

A UE in CELL_FACH state has no dedicated radio resources attributed, and can only communicate with the UTRAN via shared channels. Thus, the UE consumes few radio resources. However, the data rate available is very limited. Also, the UE needs to permanently monitor the shared channels. Thus, UE battery consumption is increased in the case where the UE is not transmitting.

A UE in CELL_PCH/URA_PCH state only monitors the paging channel at dedicated occasions, and therefore minimizes the battery consumption. However, if the network wishes to access the UE, it must first indicate this desire on the paging occasion. The network may then access the UE, but only if the UE has replied to the paging. Furthermore, the UE can only access the network after performing a Cell Update procedure which introduces additional delays when the UE wants to send data to the UTRAN.

Main system information is sent on the BCCH logical channel, which is mapped on the P-CCPCH (Primary Common Control Physical Channel). Specific system information blocks can be sent on the FACH channel. When the system information is sent on the FACH, the UE receives the configuration of the FACH either on the BCCH that is received on the P-CCPCH or on a dedicated channel. When the system information is sent on the BCCH via the P-CCPCH, then in each frame or set of two frames, a system frame number (SFN) is sent which is used to share the same timing reference between the UE and the Node B. The P-CCPCH is sent using the same scrambling code as a P-CPICH (Primary Common Pilot Channel), which is the primary scrambling code of the cell. Each channel uses a spreading code as commonly done in WCDMA (Wideband Code Division Multiple Access) systems. Each code is characterized by its spreading factor (SF), which corresponds to the length of the code. For a given spreading factor, the number of orthogonal codes is equal to the length of the code. For each spreading factor, the given set of orthogonal codes, as specified in the UMTS system, are numbered from 0 to SF−1. Each code can thus be identified by giving its length (i.e. spreading factor) and the number of the code. The spreading code that is used by the P-CCPCH is always of a fixed spreading factor 256 and the number is the number 1. The UE knows about the primary scrambling code either by information sent from the network on system information of neighboring cells that the UE has read, by messages that the UE has received on the DCCH channel, or by searching for the P-CPICH, which is sent using the fixed SF 256 and the spreading code number 0, and which transmits a fixed pattern.

The system information comprises information on neighboring cells, configuration of the RACH and FACH transport channels, and the configuration of MCCH, which is a channel dedicated for MBMS service. Each time the UE changes cells, it is camping or in idle mode. When the UE has selected the cell (in CELL_FACH, CELL_PCH or URA_PCH state), the UE verifies that it has valid system information.

The system information is organized in SIBs (system information blocks), a MIB (Master information block) and scheduling blocks. The MIB is sent very frequently and provides timing information of the scheduling blocks and the different SIBs. For SIBs that are linked to a value tag, the MIB also contains information on the last version of a part of the SIBs. SIBs that are not linked to a value tag are linked to an expiration timer. The SIBs linked to an expiration timer become invalid and need to be reread if the time of the last reading of the SIB is larger than an expiration timer value. The SIBs linked to a value tag are only valid if they have the same value tag as a value tag broadcast in the MIB. Each block has an area scope of validity, such as a Cell, a PLMN (Public Land Mobile Network) or an equivalent PLMN, which signifies on which cells the SIB is valid. A SIB with the area scope "Cell" is valid only for the cell in which it has been read. A SIB with the area scope "PLMN" is valid in the whole PLMN. A SIB with the area scope "equivalent PLMN" is valid in the whole PLMN and equivalent PLMN.

In general, UEs read the system information when they are in idle mode, CELL_FACH state, CELL_PCH state or in URA_PCH state of the cell that they have selected, i.e., the cell that they are camping on. In the system information, the UEs receive information on the neighboring cells on the same frequency, different frequencies and different RAT (Radio access technologies). This allows the UEs to know which cells are candidates for cell reselection.

The 3GPP system can provide multimedia broadcast multicast service (MBMS). The 3GPP TSG SA (Service and System Aspect) defines various network elements and their functions required for supporting MBMS services. A cell broadcast service provided by the prior art is limited to a service in which text type short messages are broadcast to a certain area. The MBMS service, however, is a more advanced service that multicasts multimedia data to terminals (UEs) that have subscribed to the corresponding service in addition to broadcasting multimedia data.

The MBMS service is a downward-dedicated service that provides a streaming or background service to a plurality of terminals by using a common or dedicated downward channel. The MBMS service is divided into a broadcast mode and a multicast mode. The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

FIG. 6 illustrates a process of providing a particular MBMS service, by using the multicast mode. The procedure can be split into two types of actions, those that are transparent and those that are not transparent to the UTRAN.

The transparent actions are described in the following. A user desiring to receive the MBMS service, first needs to subscribe in order to be allowed to receive MBMS services, to receive information on MBMS services, and to join a certain set of MBMS services. A service announcement provides the terminal with a list of services to be provided and other related information. The user can then join these services. By joining, the user indicates that the user wants to receive information linked to services that the user has subscribed to and becomes part of a multicast service group. When a user is no longer interested in a given MBMS service, the user leaves the service, i.e., the user is no longer part of the multicast service group. These actions can be taken by using any means of communication, i.e., the actions may be done using SMS (Short Messaging Service), or by Internet access. These actions do not have to necessarily be done using the UMTS system.

In order to receive a service for which the user is in a multicast group the following actions that are not transparent to the UTRAN are executed. The SGSN informs the RNC about a session start. Then the RNC notifies the UEs of the multicast group that a given service has started in order to initiate reception of the given service. After having broadcast the necessary UE actions and eventually the configuration of the PtM bearers for the given service, the transmission of the data starts. When the session stops, the SGSN indicates the stopped session to the RNC. The RNC in turn initiates a session stop. The transmission of the service from the SGSN means for the RNC to provide a bearer service for conveying the data of the MBMS service.

After the notification procedure, other procedures can be initiated between the UE and the RNC and the SGSN to enable data transmission, such as RRC connection establishment, connection establishment towards the PS domain, frequency layer convergence, and counting.

Reception of an MBMS service may be performed in parallel to the reception of other services, such as a voice or video call on the CS domain, SMS transfer on the CS or PS domain, data transfer on the PS domain, or any signaling related to the UTRAN or PS or CS domain.

Contrary to the multicast service, for broadcast services, as shown in FIG. 7, only the announcement of the service must be done in a transparent manner. No subscription or joining is needed. Afterwards, the actions that are transparent to the RNC are the same as for multicast services.

For MBMS, two additional control channels are introduced. They are the MCCH and the MICH (MBMS Notification Indicator Channel). As explained above, the MCCH is mapped on the FACH. The MICH is a new physical channel and is used to notify users to read the MCCH channel. The MICH is designed to allow the UEs to perform a DRX (Discontinuous Reception) scheme. DRX allows the reduction of battery consumption for UEs while allowing the UEs to still be aware of any service for which a session is starting. The MICH may be used to inform the UE of a change in a frequency convergence scheme, change of a configuration of a point-to-multipoint (PtM) bearer, switch between the PtM bearer and a point-to-point (PtP) bearer, etc., which all require the MCCH to be read.

The MCCH channel periodically transmits information regarding active services, MTCH configuration, frequency convergence, etc. The UE reads the MCCH information to receive the subscribed services based on different triggers. For example, the UE may be triggered after cell selection/reselection, when the UE is notified of a given service on the MICH, or when the UE is notified via the DCCH channel. The MCCH carries different messages, such as MBMS Common p-t-m rb Information, MBMS Current Cell p-t-m rb Information, MBMS General Information, MBMS Modified services Information, MBMS Neighbouring Cell p-t-m rb Information or MBMS Unmodified services Information and MBMS Access Information.

The MCCH information is transmitted based on a fixed schedule. The schedule identifies a transmission time interval (TTI) containing the beginning of the MCCH information. The transmission of the information may take a variable number of TTIs. The UTRAN transmits the MCCH information in consecutive TTIs. The mobile terminal (UE) continues to receive the SCCPCH until: 1) the UE receives all of the MCCH information; 2) the UE receives a TTI that does not include any MCCH data; or 3) the information contents indicate that further reception is not required (e.g. there is no modification to the desired service information).

Based on this behavior, the UTRAN may repeat the MCCH information following a scheduled transmission in order to improve reliability. The MCCH schedule is common for all services. The entire MCCH information is transmitted periodically based on a "repetition period". A "modification period" is defined as an integer multiple of the repetition period. The MBMS ACCESS INFORMATION may be transmitted periodically based on an "access info period". This period is an integer divider of the "repetition period".

MCCH information may be categorized as critical and non-critical information. Changes to critical information will only be applied at the first MCCH transmission of a modification period. At the beginning of each modification period, the UTRAN transmits the MBMS Modified services Information including, amongst others, information on MBMS services whose MCCH information is modified at that modification period. MBMS Modified services Information is repeated at least once in each repetition period of that modification period. Changes to non-critical information may take place at any time. FIG. 8 illustrates a schedule with which the MBMS Modified services Information and the remaining information sent on MCCH are transmitted. Differently patterned blocks indicate potentially different MCCH content.

An MBMS notification mechanism is used to inform UEs of an upcoming change in critical MCCH information. Notifications on MICH are based on service groups. Notifications might also be sent via dedicated signaling to UEs using the DCCH channel. The mapping between service IDs and service groups are based on a hashing mechanism. The MBMS notification indicators are sent on MICH. A single MICH frame is able to carry indications for every service group.

Critical MCCH information can only be changed at the beginning of a modification period. The MBMS notification indicator corresponding to the service group of every affected service is set continuously during the entire modification period preceding the first change in MCCH information related to a given service. Subsequent changes in the MCCH information in the next modification period related to the same service can be signaled on the MCCH.

UEs that are not receiving any MBMS services on MTCH or on a PtP channel are free to read the MBMS notification at any time; however, the modification interval is long enough so that the UEs are able to reliably detect the notification even if they only receive the MICH during regular paging occasions.

Upon detecting the MBMS notification indication for a service group, the UEs interested in a service corresponding to the service group start reading the MCCH at the beginning of the next modification period. The UE reads at least the MBMS Modified services Information.

FIG. 9 illustrates the timing relationship between the setting of the MICH and the first MCCH critical information change. For the MICH, a period 20, designated by a diagonal pattern, indicates when a Notification Indicator (NI) is set for a service. For the MCCH, differently patterned blocks indicate MCCH content related to the notification of different services.

UEs, which are receiving MBMS service(s) on MTCH in idle mode or in a URA_PCH, CELL_PCH, or CELL_FACH state read the MCCH at the beginning of each modification period to receive the MBMS Modified services Information. The MBMS Modified services Information indicates, amongst others, MBMS service IDs, and optionally, an MBMS Session ID, whose MCCH information is modified at a modification period. If the MBMS service IDs and the MBMS Session ID, which the UE has activated, is indicated in the MBMS Modified services Information, the UE reads the rest of the MCCH information.

MBMS Counting is used to determine the optimum transmission mechanism for a given service. The need for counting is indicated in the notification, and achieved by requesting UEs, belonging to the same MBMS service group, to establish an RRC connection. The exact number of UEs that need to be brought to RRC connected mode is a Radio Resource Management (RRM) issue. Since it is desirable in a specific cell, to avoid bringing a large number of UEs for counting purposes to RRC connected mode at the same time (RACH load, etc), RRM may control the load due to the RRC connection establishment requests, by setting an access "probability factor".

Following counting, the number of subscribers that need to be maintained in RRC connected mode or for which the RNC releases their connection, is also an RRM issue. For a given MBMS service, the counting indication in the notification may be switched on and off, on a per cell basis. The RNC may use notification to indicate counting during an ongoing MBMS session. The term used for this is re-counting. The RNC receives, via Iu from the CN, information (MBMS service ID) about UEs that are in RRC Connected mode, and have joined the MBMS service. This information may be used for counting purposes.

The MBMS counting function includes a mechanism by which the UTRAN can prompt users interested in a given service to become RRC connected. This procedure is only applicable for UEs in idle mode and relies on the MBMS ACCESS INFORMATION transmitted on the MCCH. The probability factor indicates the probability with which UEs need to attempt an RRC connection procedure.

Once a UE detects that the counting procedure is ongoing for the specific service it wants to receive, it will attempt to set up an RRC connection based on the probability factor included in the MCCH. UEs in a URA_PCH, CELL_PCH and/or CELL_FACH state, which are notified on the MCCH, shall initiate a cell update procedure with a specific cause based upon the information provided in the MBMS ACCESS INFORMATION.

Also, the UE will keep receiving the MBMS ACCESS INFORMATION at every access info period unless the UE in idle mode becomes RRC connected, the UE in the URA_PCH, CELL_PCH or CELL_FACH state finishes the cell update procedure successfully, the RRC Connection Setup procedure or Cell Update procedure are ongoing, or counting is no longer required. Whenever it receives new MBMS ACCESS INFORMATION, the UE will update its probability factor with the new value.

FIG. 10 illustrates the above-mentioned mechanism. For the MICH, a period 30, designated by a diagonal pattern, indicates when the NI is set for the service. For the MBMS ACCESS INFORMATION, the blocks having a diagonal pattern indicate that the counting procedure is ongoing, and that the UEs need to establish an RRC connection based on the included probability factor (PF). For the critical MCCH Info, differently patterned blocks indicate potentially different content.

For every UE brought to RRC connected state for the purpose of counting, the UTRAN will initiate a PMM Connection establishment procedure and will obtain from the CN the set of MBMS services the users have joined. Counting for ongoing services (re-counting) will rely on the same scheduling of the MCCH information.

In order to be able to read the MCCH, the UE needs information related to the configuration of the MCCH. More specifically, the UE requires information regarding the "Modification Period," the "Repetition period," and the offset between the transmission of the first frame of the modification period and the SFN of the cell in which the information is sent. Furthermore, the information on the MCCH can be carried in more than one TTI. However, it is inefficient for the UE to read more TTIs than necessary. Thus, the UE also requires information regarding the number of TTIs that the UE shall read.

SUMMARY OF THE INVENTION

The present invention is directed to a method for transmitting and receiving information for configuring an MBMS control channel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for transmitting control information in a wireless communication system, the method comprising, generating configuration information for configuring a point-to-multipoint control channel and transmitting the configuration information to a mobile terminal. The configuration information comprises at least one of a modification period, a repetition period, a SFN-MCCH-Offset comprising an offset between a transmission of a first frame of a modification period and a system frame number (SFN) of a cell in which the configuration information is transmitted, and a number of transmission time intervals (TTIs) the mobile terminal will read at each beginning of a repetition period.

Preferably, the configuration information is transmitted from a radio network controller (RNC). The modification period is a time through which critical information is not changed. The repetition period is a time between successive repetition of the transmission of critical and non-critical information. The SFN-MCCH-Offset is an offset between a SFN 0 and a first transmission of critical and non-critical information.

In one aspect of the present invention, the SFN-MCCH-Offset is a multiple of 256 chips and is a maximum time of a maximum modification period. Preferably, the maximum SFN-MCCH-Offset is 4096 frames.

Preferably, the configuration information is transmitted to the mobile terminal periodically. In another aspect of the invention, the configuration information is transmitted to the mobile terminal as a system information message on a logical channel BCCH. The configuration information may also be transmitted to the mobile terminal as a point-to-multipoint control message on a logical channel MCCH. Furthermore, the configuration information may be transmitted to the mobile terminal on a dedicated channel.

The configuration information may be MCCH scheduling information. Also, the configuration information may be transmitted to the mobile terminal in a system information message and a point-to-multipoint control message.

In accordance with one embodiment of the present invention, a method for receiving control information in a wireless communication system comprises receiving from a network configuration information for configuring a point-to-multipoint control channel and reading the point-to-multipoint control channel according to the configuration information. The configuration information comprises at least one of a modification period, a repetition period, a SFN-MCCH-Offset comprising an offset between a transmission of a first frame of a modification period and a system frame number (SFN) of a cell in which the configuration information is transmitted, and a number of transmission time intervals (TTIs) the mobile terminal will read at each beginning of a repetition period.

Preferably, the configuration information is received from a radio network controller (RNC). The modification period is a time through which critical information is not changed. The repetition period is a time between successive repetition of the transmission of critical and non-critical information. The SFN-MCCH-Offset is an offset between a SFN 0 and a first transmission of critical and non-critical information.

In one aspect of the invention, the SFN-MCCH-Offset is a multiple of 256 chips and is a maximum time of a maximum modification period. Preferably, the maximum SFN-MCCH-Offset is 4096 frames.

Preferably, the configuration information is transmitted to the mobile terminal periodically. In another aspect of the invention, the configuration information is received as a system information message on a logical channel BCCH. The configuration information may also be received as a point-to-multipoint control message on a logical channel MCCH. Furthermore, the configuration information may be received on a dedicated channel.

The configuration information may be MCCH scheduling information. Also, the configuration information may be received in a system information message and a point-to-multipoint control message.

In accordance with another embodiment of the present invention, an apparatus for receiving control information in a wireless communication system comprises means for receiving from a network configuration information for configuring a point-to-multipoint control channel and means for reading the point-to-multipoint control channel according to the configuration information. The configuration information comprises at least one of a modification period, a repetition period, a SFN-MCCH-Offset comprising an offset between a transmission of a first frame of a modification period and a system frame number (SFN) of a cell in which the configuration information is transmitted, and a number of transmission time intervals (TTIs) the mobile terminal will read at each beginning of a repetition period.

In accordance with another embodiment of the present invention, an apparatus for transmitting control information in a wireless communication system comprises means for generating configuration information for configuring a point-to-multipoint control channel and means for transmitting the configuration information to a mobile terminal. The configuration information comprises at least one of a modification period, a repetition period, a SFN-MCCH-Offset comprising an offset between a transmission of a first frame of a modification period and a system frame number (SFN) of a cell in which the configuration information is transmitted, and a number of transmission time intervals (TTIs) the mobile terminal will read at each beginning of a repetition period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

The present invention relates to a method for transmitting and receiving information for configuring a point-to-multipoint control channel in a wireless communication system.

A UTRAN utilizes an MBMS Control Channel (MCCH) to periodically transmit MBMS control information to a mobile terminal. The MBMS control information may include information about active MBMS services, configuration information for a traffic channel, such as MTCH, or information about frequency convergence, among others. The mobile terminal reads the MBMS control information on the MCCH in order to receive MBMS services it has subscribed to based on different triggers. For example, the mobile terminal may read the MBMS control information after cell selection/reselection, when the mobile terminal is notified of a given MBMS service on MICH, or when the mobile terminal is notified of a given MBMS service via DCCH, among other triggers. The MCCH carries different control messages such as MBMS Common p-t-m rb Information, MBMS Current Cell p-t-m rb Information, MBMS General Information, MBMS Modified services Information, MBMS Unmodified services Information, MBMS Neighbouring Cell p-t-m rb Information and MBMS Access Information.

In order to read the MCCH, the mobile terminal requires information on the configuration of the MCCH. Thus, in accordance with one embodiment of the present invention, configuration information for configuring the MCCH is generated in the UTRAN and transmitted to the mobile terminal. In one aspect of the invention, the configuration information may be MCCH scheduling information for allowing discontinuous transmission (DTX) of data. Preferably, the configuration information comprises at least one of a modification period, a repetition period, an SFN-MCCH-Offset, and a number of transmission time intervals (TTIs) the mobile terminal will read at each beginning of a repetition period.

The modification period informs the mobile terminal of a time through which critical information transmitted on the MCCH is not changed. The repetition period informs the mobile terminal of a time between successive repetition of the transmission of critical and non-critical information.

Figure 1:
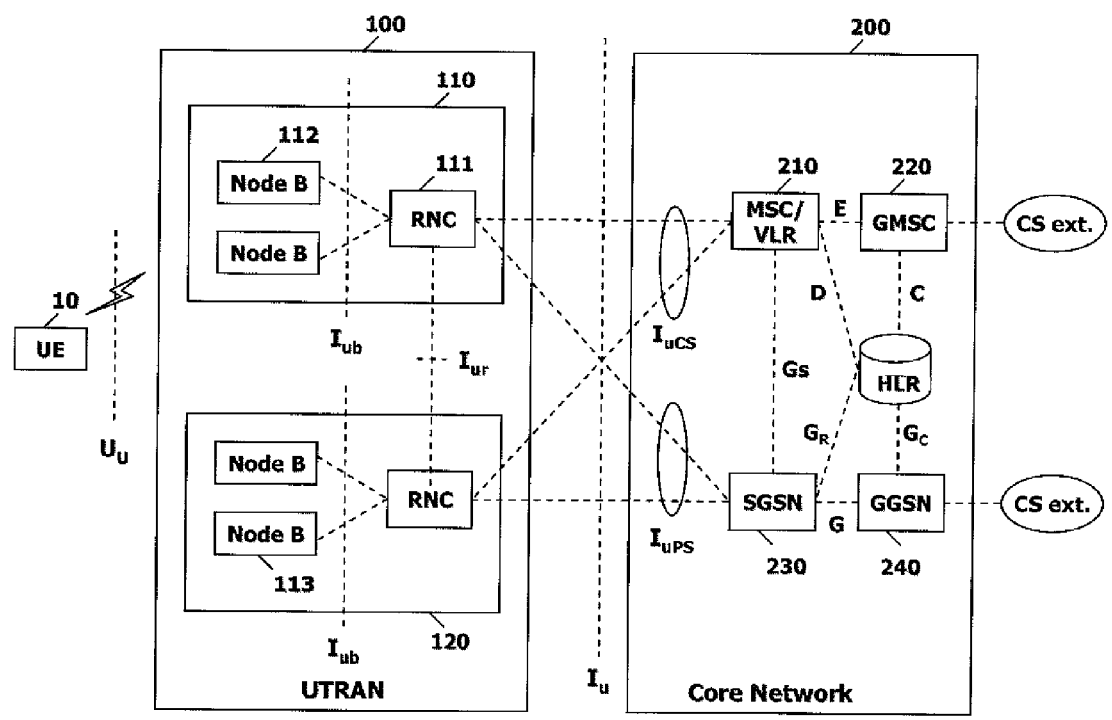
FIG. 1 is a block diagram of a general UMTS network architecture.
Figure 2:
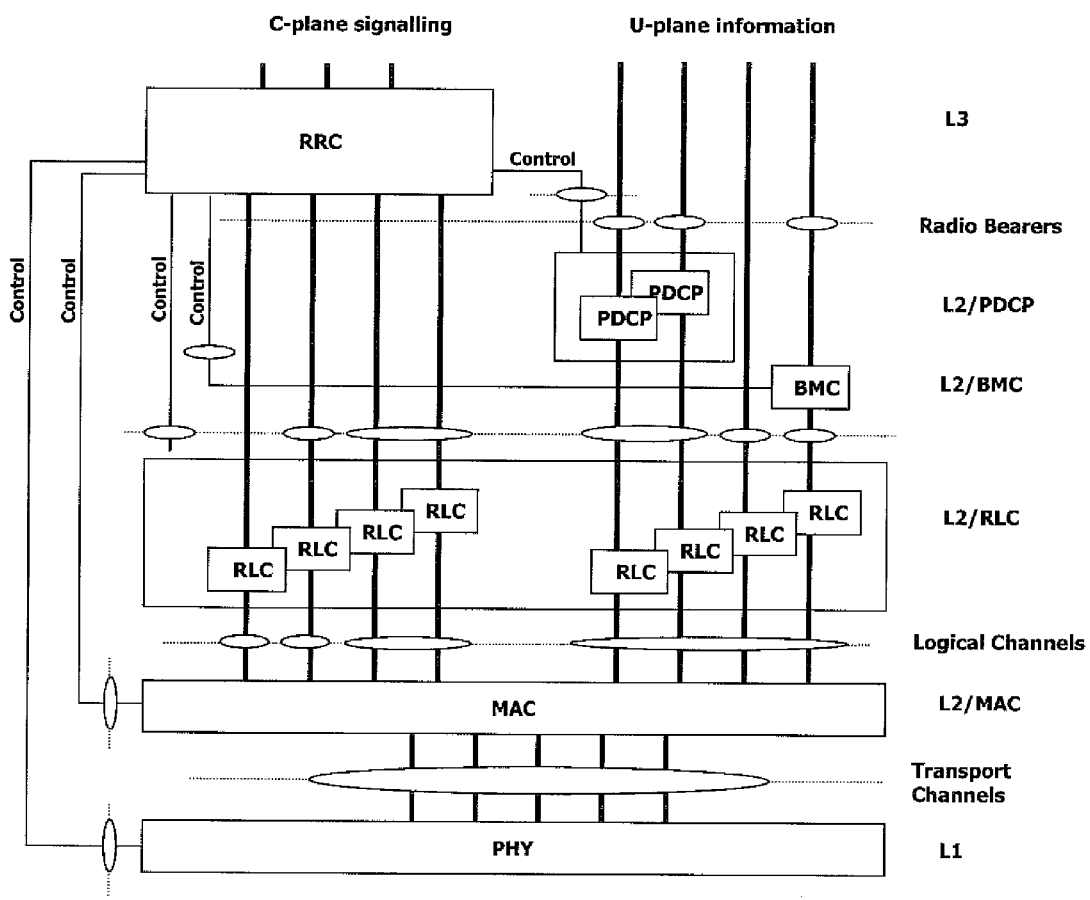
FIG. 2 is a block diagram of a structure of a radio interface protocol between a terminal and a UTRAN based on 3GPP radio access network standards.
Figure 3:
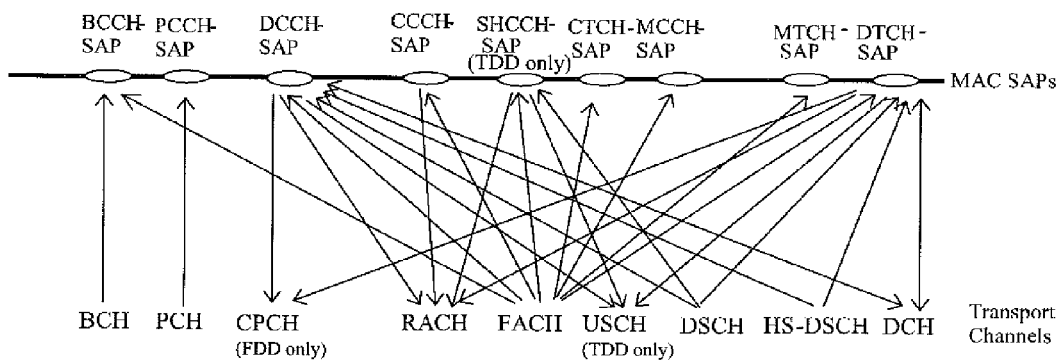
FIG. 3 illustrates the mapping of logical channels onto transport channels as seen by the mobile terminal.
Figure 4:
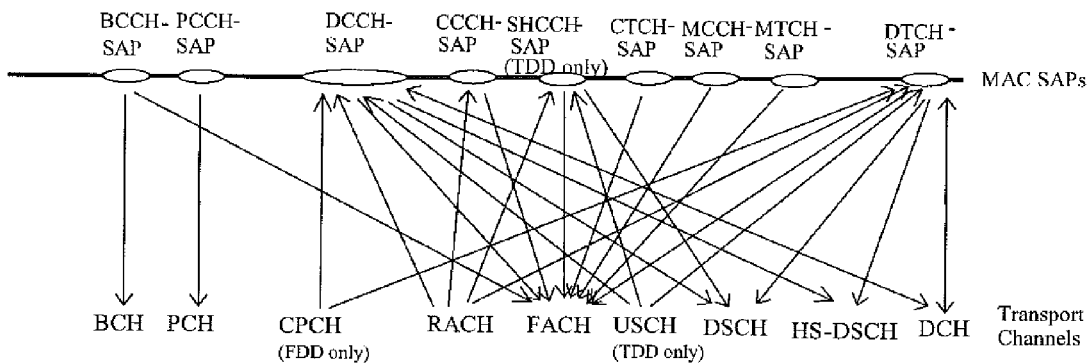
FIG. 4 illustrates the mapping of logical channels onto transport channels as seen by the UTRAN.
Figure 5:
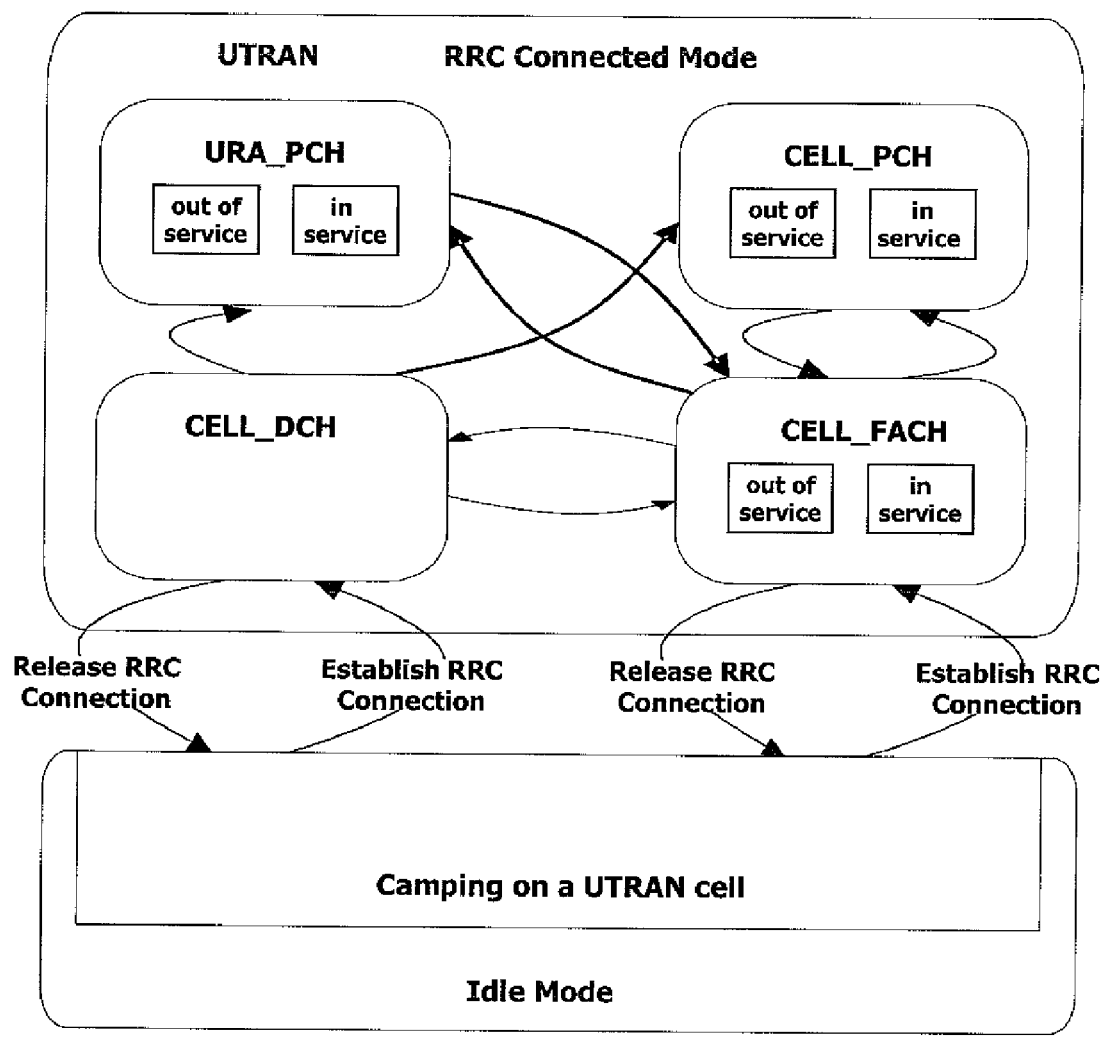
FIG. 5 illustrates possible transitions between modes and states in the UMTS network.
Figure 6:
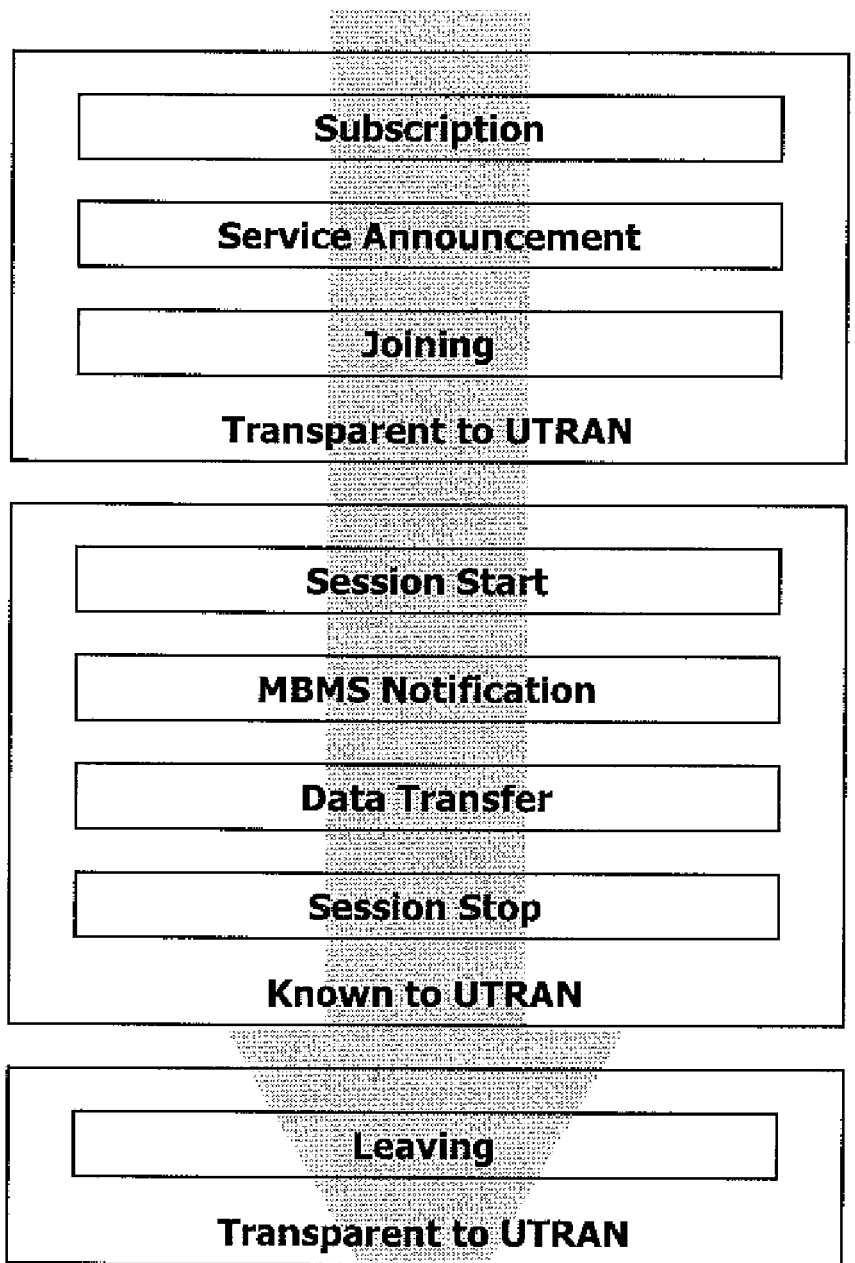
FIG. 6 illustrates a process of providing a particular MBMS service using a multicast mode.
Figure 7:
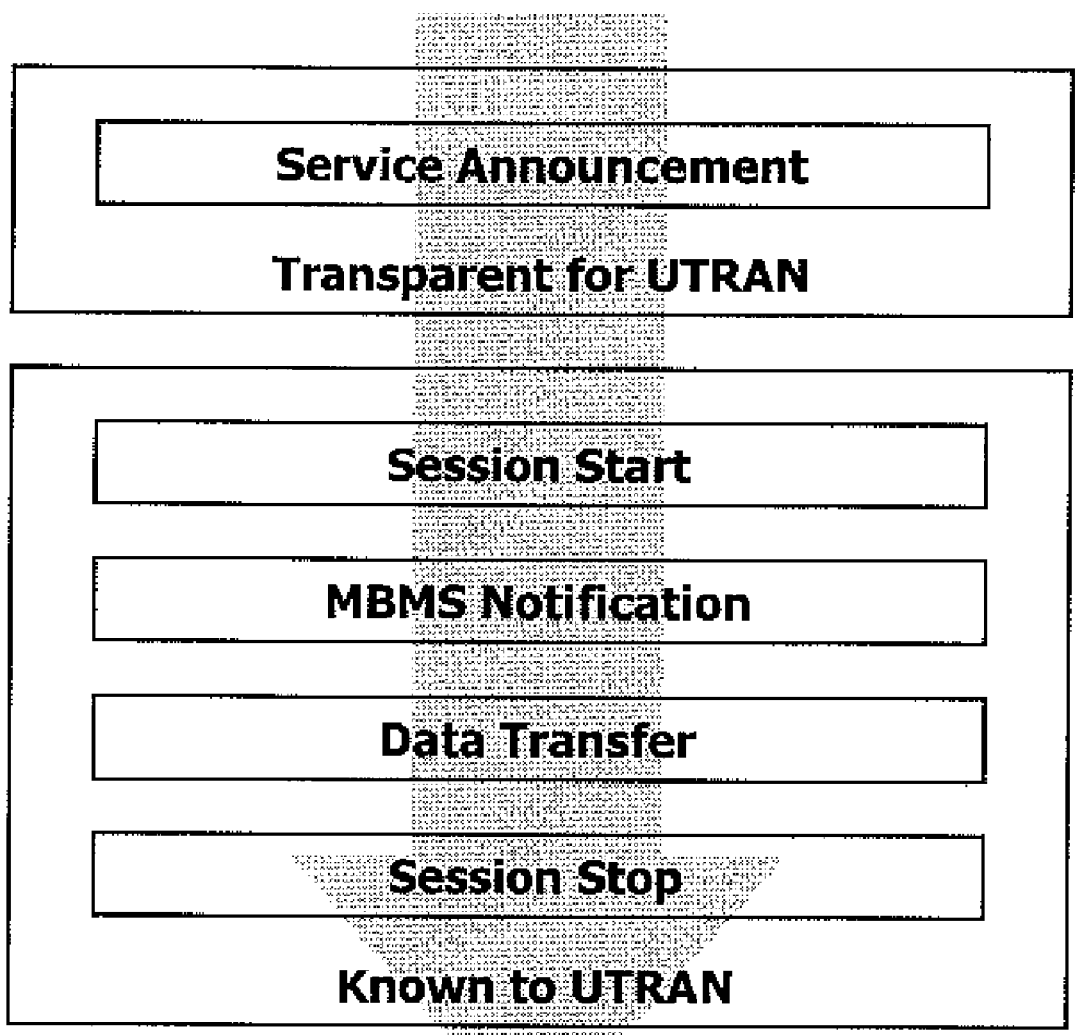
FIG. 7 illustrates a process of providing broadcast services.
Figure 8:
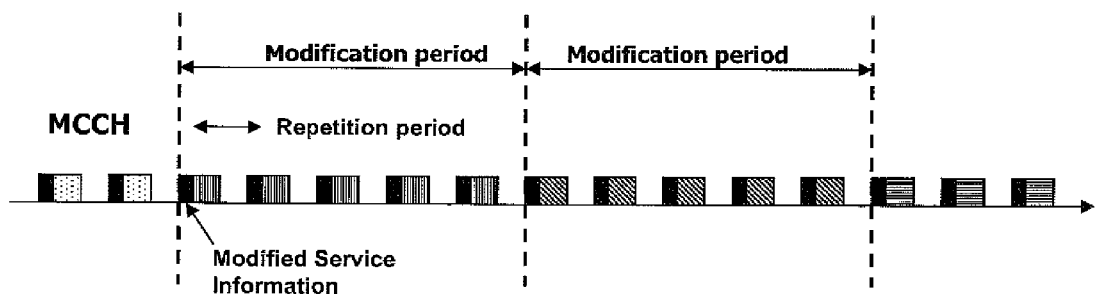
FIG. 8 illustrates a schedule for transmitting information on an MCCH.
Figure 9:
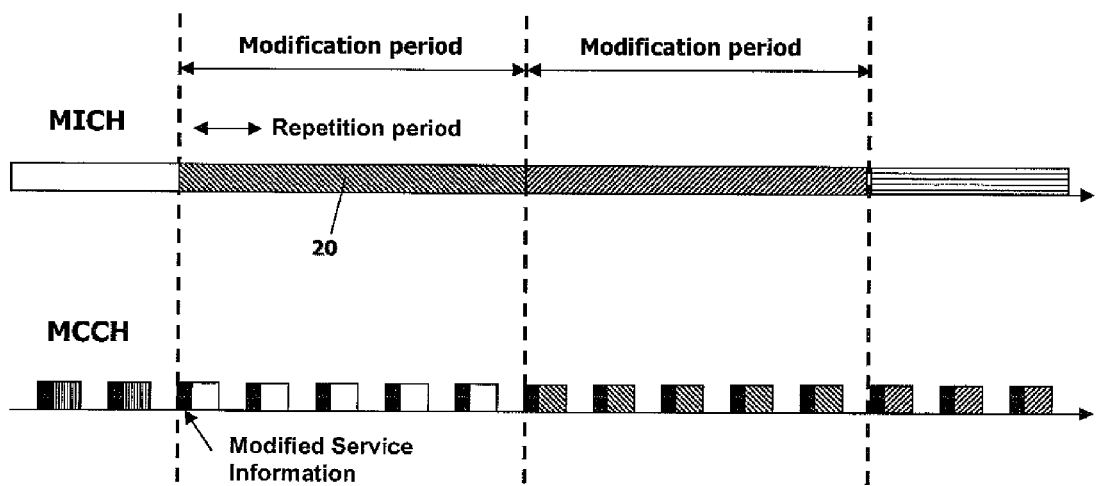
FIG. 9 illustrates MICH timing relative to a modification period.
Figure 10:
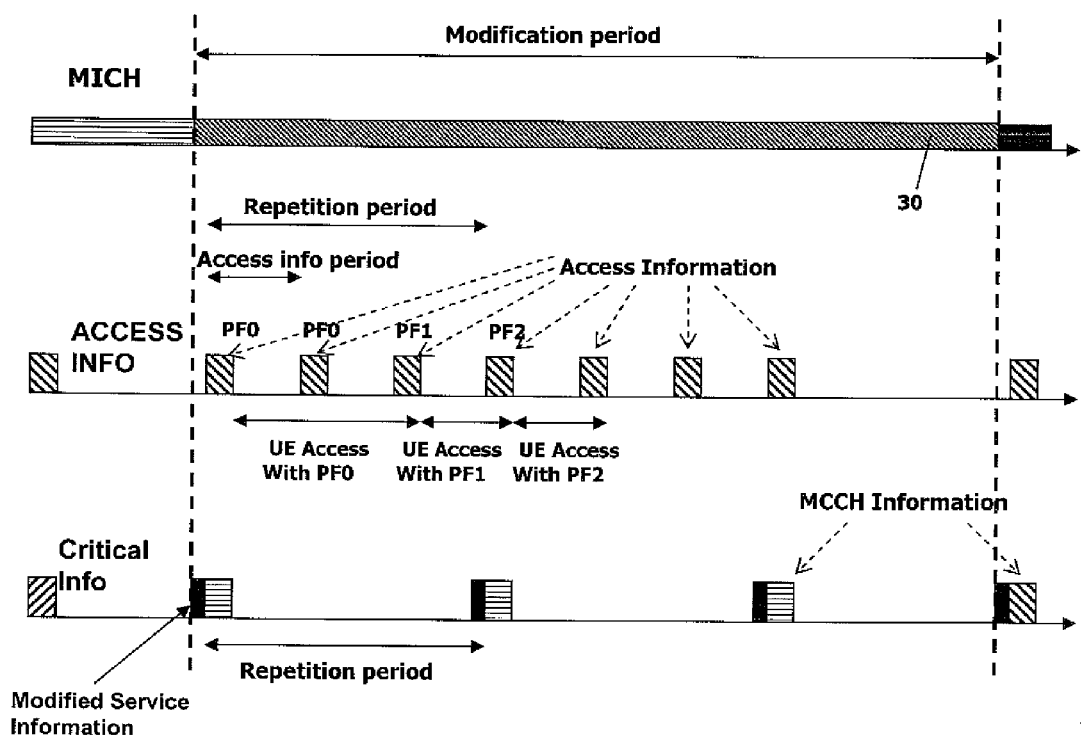
FIG. 10 illustrates an Access Info period during MBMS counting.
Figure 11:
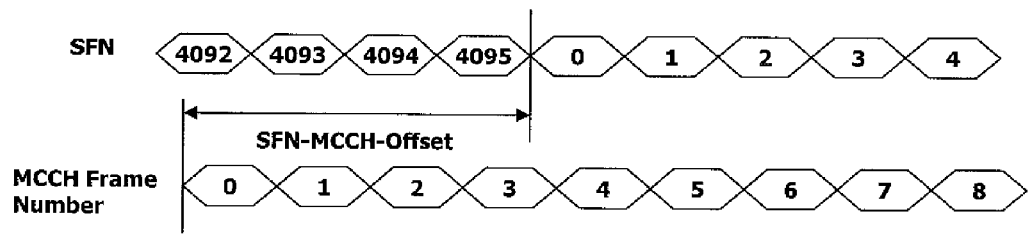
FIG. 11 illustrates an offset between a system frame number (SFN) and the beginning of a modification period, in accordance with one embodiment of the present invention.

Referring to FIG. 11, the SFN-MCCH-Offset relates to an offset between the transmission of a first frame of a modification period and a system frame number (SFN) of a cell in which the configuration information is transmitted. Preferably, the SFN-MCCH Offset is the offset between an SFN 0 and a first occurrence of the broadcast of critical and non-critical information. The offset may be in multiples of 256 chips and correspond to a maximum time of the maximum modification period, which corresponds to the granularity of the chip offset for the RLs and S-CCPCHs in the UMTS system in one cell. The maximum SFN that can be signaled with the 12 available bits is 4095. As such, the maximum possible modification period is 4,095 frames, i.e., 40.95 seconds.

Information transmitted on the MCCH may be carried in more than one transmission time interval (TTI). Previously, the mobile terminal would continue receiving a physical channel carrying the MCCH information until it received a TTI that did not include any MCCH data. Thus, a problem arises because the mobile terminal reads more TTIs than necessary. In order to optimize the reception of information on MCCH, the mobile terminal must know how many TTIs to read. Therefore, the present invention provides for the transmission of the number of TTIs that the mobile terminal shall read at each beginning of a repetition period. Preferably, the number of TTIs is transmitted from an RNC of the UTRAN to the mobile terminal.

Figure 12:
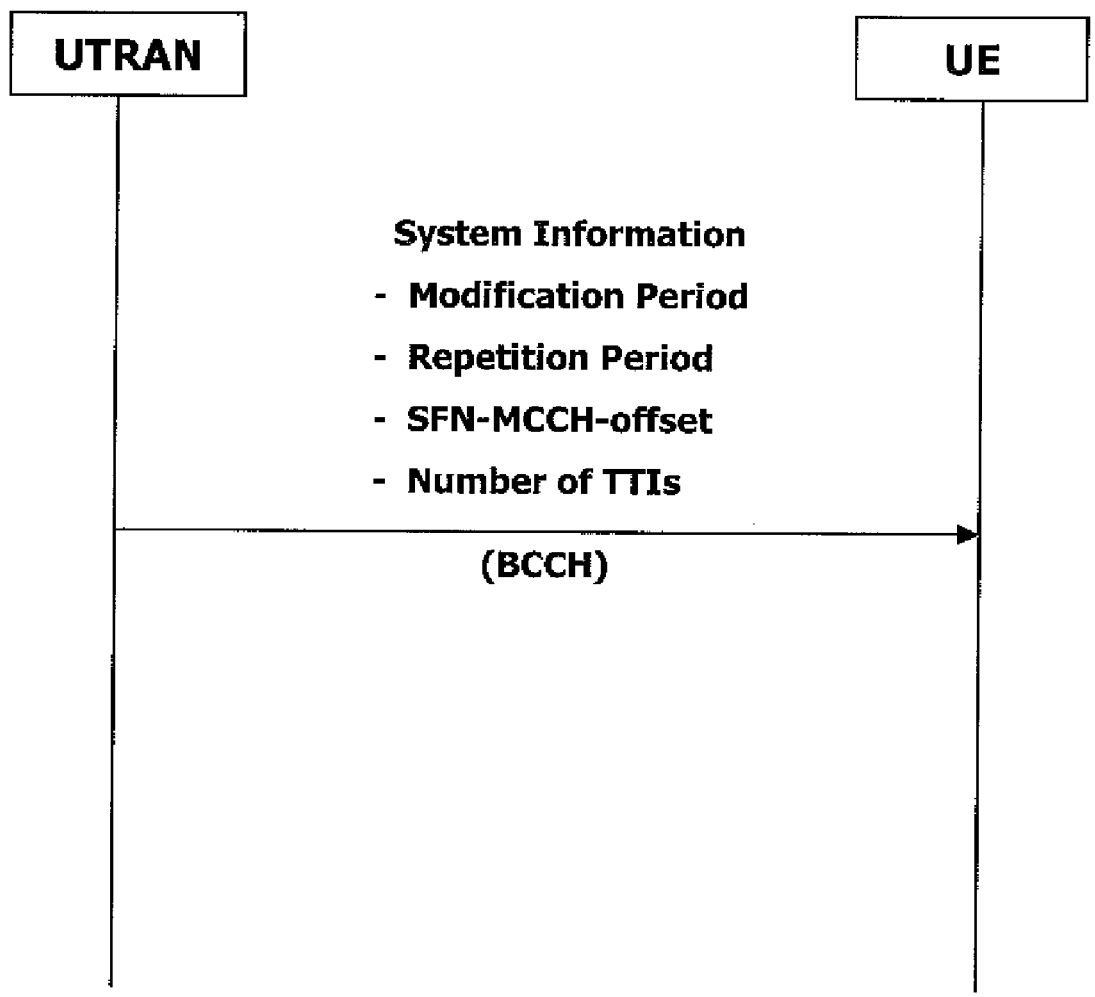
FIG. 12 illustrates MCCH configuration information being transmitted in a system information message, in accordance with one embodiment of the present invention.

Referring to FIG. 12, the configuration information may be transmitted to the mobile terminal as a system information message. Therefore, any one or combination of, the modification period, the repetition period, the SFN-MCCH-Offset, and the number of TTIs to be read may be transmitted from the UTRAN and received by the mobile terminal through a logical channel BCCH.

Figure 13:
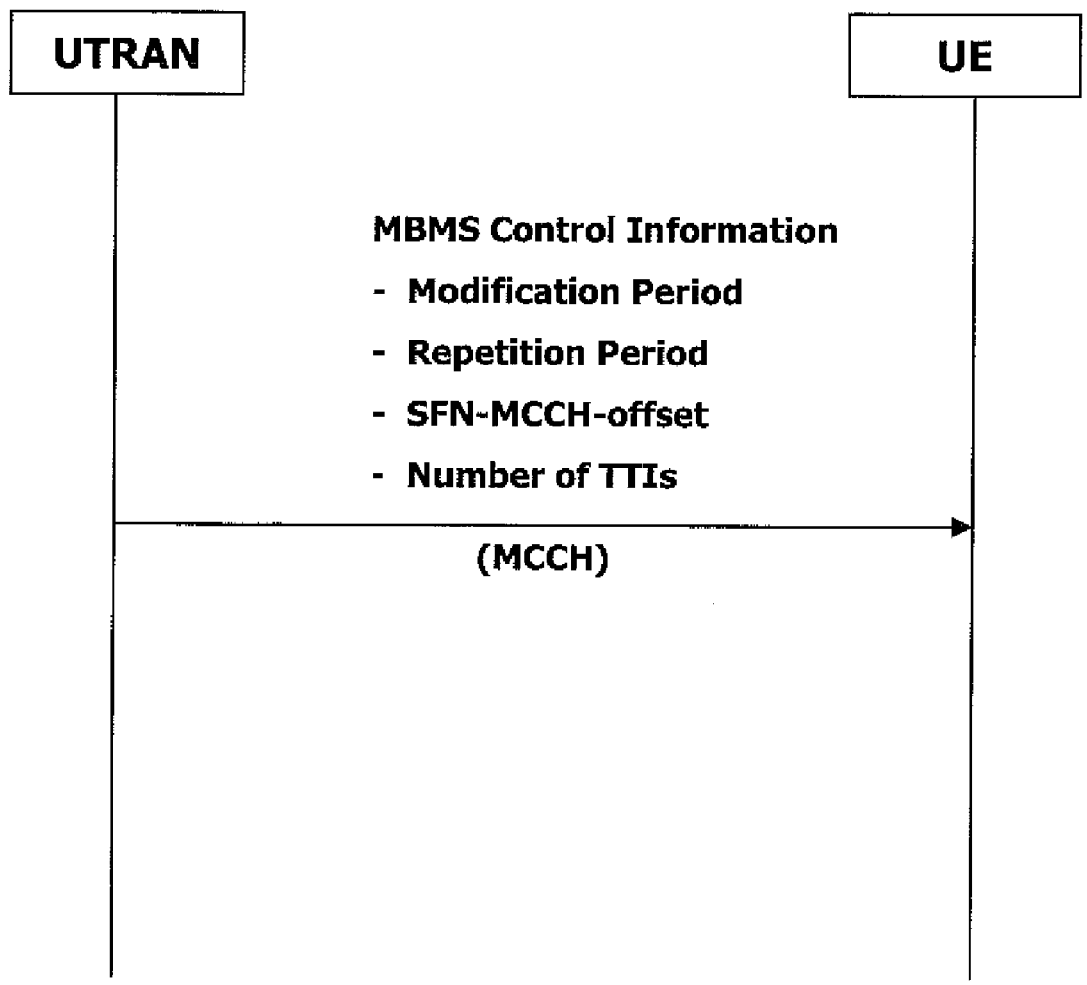
FIG. 13 illustrates MCCH configuration information being transmitted in an MBMS control message, in accordance with one embodiment of the present invention.

Alternatively, the configuration information may be transmitted to the mobile terminal as an MBMS control message, as shown in FIG. 13. Accordingly, any one or combination of, the modification period, the repetition period, the SFN-MCCH-Offset and the number of TTIs to be read may be transmitted from the UTRAN and received by the mobile terminal through a logical channel MCCH.

Figure 14:
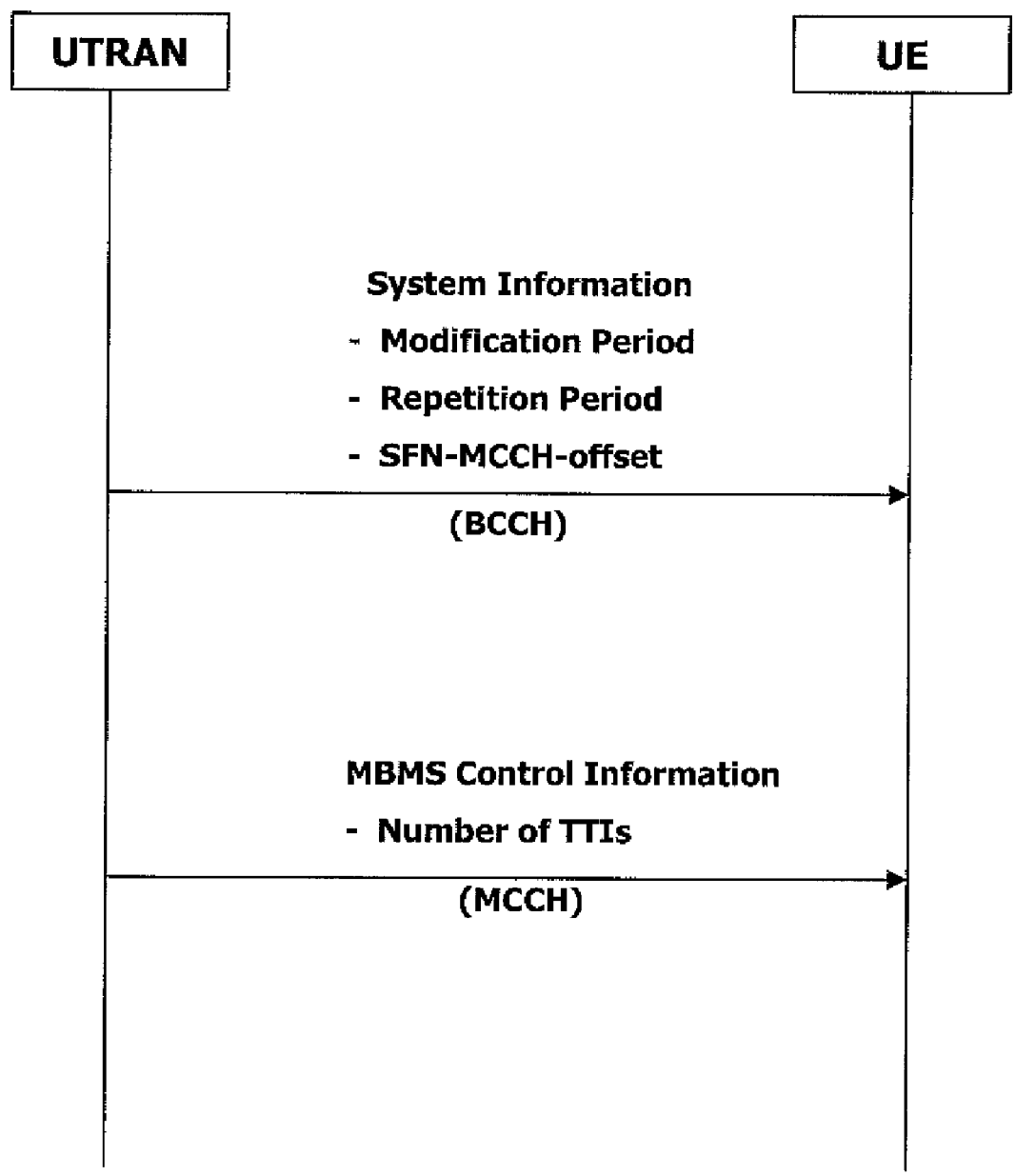
FIG. 14 illustrates MCCH configuration information being transmitted in a system information message and an MBMS control message, in accordance with one embodiment of the present invention.

Furthermore, the present invention also provides that the modification period, the repetition period, the SFN-MCCH-Offset and the number of TTIs to be read may be transmitted to the mobile terminal through a dedicated channel. It is further provided that not all elements of the configuration information must necessarily be transmitted in one type of message. Therefore, for example, as shown in FIG. 14, the modification period, the repetition period and the SFN-MCCH-Offset may be transmitted in a system information message on a logical channel BCCH while the number of TTIs to be read is transmitted in an MBMS control message on a logical channel MCCH.

The following are examples including a mobile communication device and a mobile communication network using the methods of the present invention.

Figure 15:
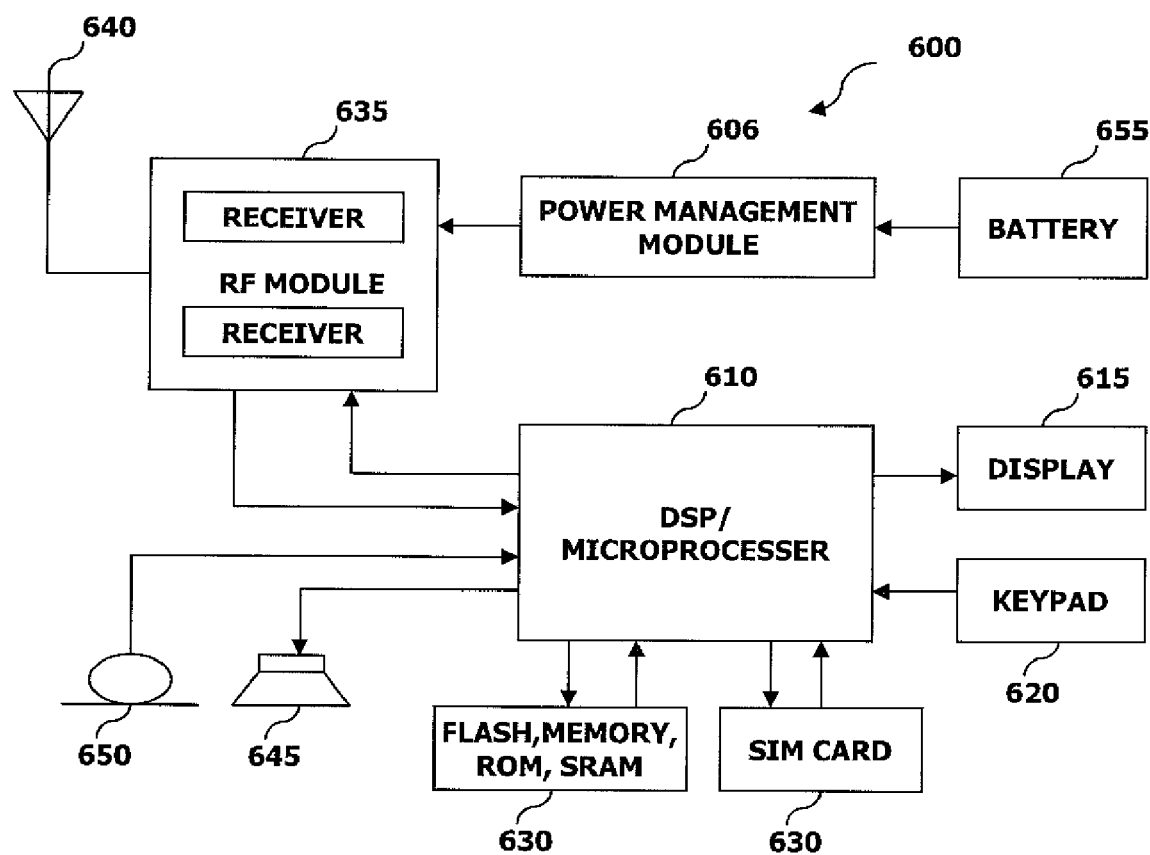
FIG. 15 is a block diagram illustrating a mobile communication device incorporating the methods of the present invention.

Referring to FIG. 15, the mobile communication device 600 comprises a processing unit 610 such as a microprocessor or digital signal processor, an RF module 635, a power management module 606, an antenna 640, a battery 655, a display 615, a keypad 620, a storage unit 630 such as flash memory, ROM or SRAM, a speaker 645 and a microphone 650.

A user enters instructional information, for example, by pushing the buttons of a keypad 620 or by voice activation using the microphone 650. The processing unit 610 receives and processes the instructional information to perform the appropriate function. Operational data may be retrieved from the storage unit 630 to perform the function. Furthermore, the processing unit 610 may display the instructional and operational information on the display 615 for the user's reference and convenience.

The processing unit 610 issues instructional information to the RF module 635, to initiate communication, for example, transmit radio signals comprising voice communication data. The RF module 635 comprises a receiver and a transmitter to receive and transmit radio signals. The antenna 640 facilitates the transmission and reception of radio signals. Upon receiving radio signals, the RF module 635 may forward and convert the signals to baseband frequency for processing by the processing unit 610. The processed signals would be transformed into audible or readable information outputted via the speaker 645. Preferably, the processing unit 610 performs the methods of the present invention. Other features, as described above in the figures, may be incorporated as well in this embodiment.

The processing unit 610 stores messages received from and transmitted to other users in the storage unit 630, receives a conditional request for message input by the user and processes the conditional request to read data corresponding to the conditional request from the storage unit. The processing unit 610 outputs message data to the display unit 615. The storage unit 630 is adapted to store message data of the messages both received and transmitted.

Figure 16:
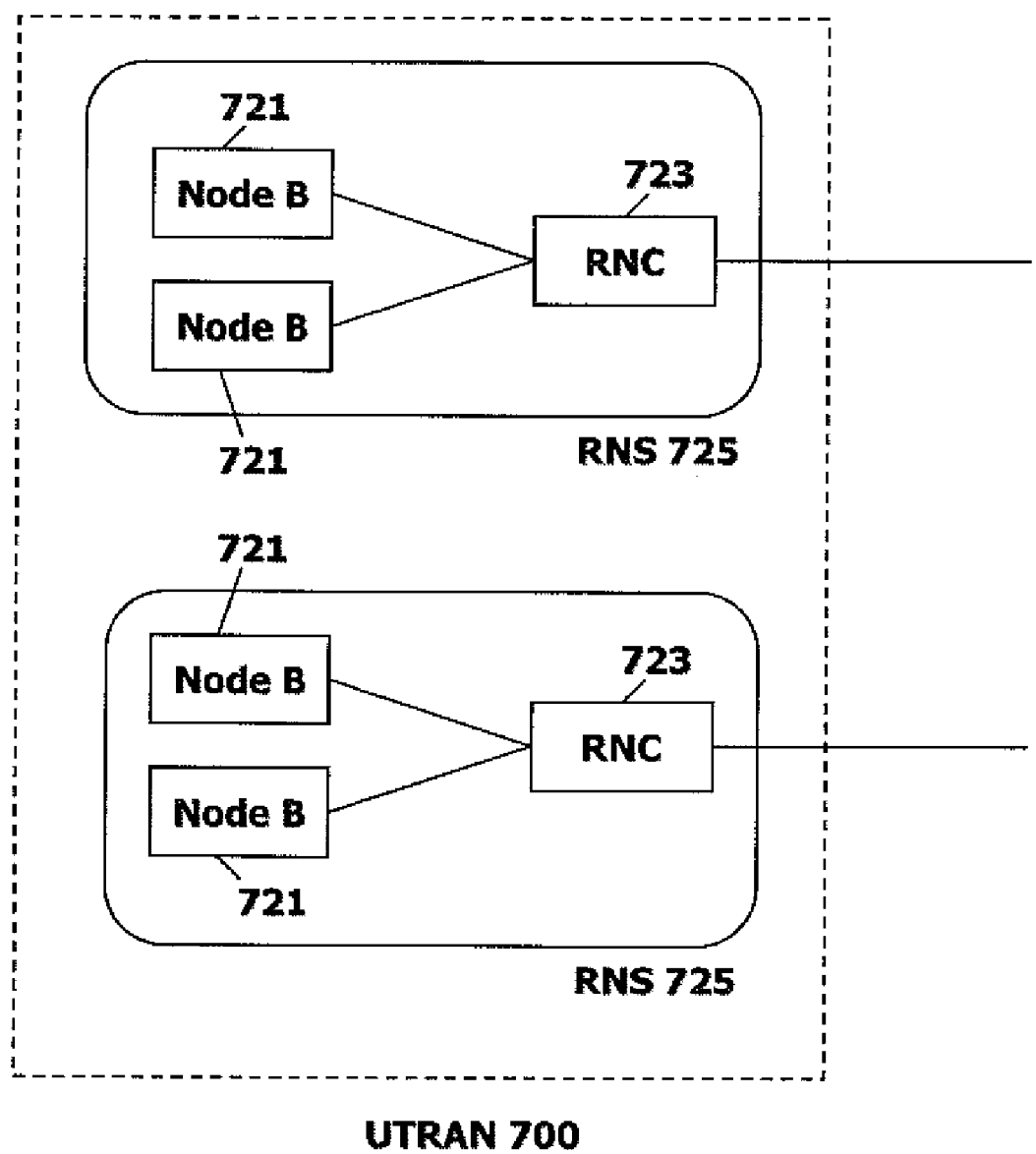
FIG. 16 is a block diagram illustrating a UTRAN incorporating the methods of the present invention.

Referring to FIG. 16, the UTRAN 700 includes one or more radio network sub-systems (RNS) 725. Each RNS 725 includes a radio network controller (RNC) 723 and a plurality of Node-Bs (base stations) 721 managed by the RNC. The RNC 723 handles the assignment and management of radio resources and operates as an access point with respect to the core network. Furthermore, the RNC 723 is adapted to perform the methods of the present invention.

The Node-Bs 721 receive information sent by the physical layer of the terminal 600 through an uplink, and transmit data to the terminal through a downlink. The Node-Bs 721 operate as access points, or as a transmitter and receiver, of the UTRAN 700 for the terminal. It will be apparent to one skilled in the art that the mobile communication device 600 may be readily implemented using, for example, the processing unit 610 (of FIG. 16) or other data or digital processing device, either alone or in combination with external support logic.

Although the present invention is described in the context of a consumer product, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving control information in a wireless communication system, the method comprising:
   receiving from a network configuration information for configuring a point-to-multipoint control channel; and
   reading the point-to-multipoint control channel according to the configuration information;
   wherein the configuration information comprises:
      a modification period;
      a repetition period;
      a system frame number (SFN)-multimedia broadcast multicast service (MBMS) control channel (MCCH)-Offset comprising an offset between a transmission of a first frame of a modification period and a SFN of a cell in which the configuration information is transmitted; and
      a number of transmission time intervals (TTIs) a mobile terminal will read at each beginning of a repetition period.

2. The method of claim 1, wherein the configuration information is received from a radio network controller (RNC).

3. The method of claim 1, wherein the modification period is a time through which critical information is not changed.

4. The method of claim 1, wherein the repetition period is a time between successive repetition of the transmission of critical and non-critical information.

5. The method of claim 1, wherein the SFN-MCCH-Offset is an offset between a SFN 0 and a first transmission of critical and non-critical information.

6. The method of claim 5, wherein the SFN-MCCH-Offset is a multiple of 256 chips.

7. The method of claim 1, wherein the SFN-MCCH-Offset is a maximum time of a maximum modification period.

8. The method of claim 1, wherein the maximum SFN-MCCH-Offset is 4096 frames.

9. The method of claim 1, wherein the configuration information is transmitted to the mobile terminal periodically.

10. The method of claim 1, wherein the configuration information is received as a system information message on a logical channel broadcast control channel (BCCH).

11. The method of claim 1, wherein the configuration information is received as a point-to-multipoint control message on a logical channel MCCH.

12. The method of claim 1, wherein the configuration information is received on a dedicated channel.

13. The method of claim 1, wherein the configuration information is MCCH scheduling information.

14. The method of claim 1, wherein the configuration information is received in a system information message and a point-to-multipoint control message.

15. A method for transmitting control information in a wireless communication system, the method comprising:
generating configuration information for configuring a point-to-multipoint control channel; and
transmitting the configuration information to a mobile terminal;
wherein the configuration information comprises:
a modification period;
a repetition period;
a system frame number (SFN)-multimedia broadcast multicast service (MBMS) control channel (MCCH)-Offset comprising an offset between a transmission of a first frame of a modification period and a SFN of a cell in which the configuration information is transmitted; and
a number of transmission time intervals (TTIs) the mobile terminal will read at each beginning of a repetition period.

16. The method of claim 15, wherein the configuration information is transmitted from a radio network controller (RNC).

17. The method of claim 15, wherein the modification period is a time through which critical information is not changed.

18. The method of claim 15, wherein the repetition period is a time between successive repetition of the transmission of critical and non-critical information.

19. The method of claim 15, wherein the SFN-MCCH-Offset is an offset between a SFN 0 and a first transmission of critical and non-critical information.

20. The method of claim 19, wherein the SFN-MCCH-Offset is a multiple of 256 chips.

21. The method of claim 15, wherein the SFN-MCCH-Offset is a maximum time of a maximum modification period.

22. The method of claim 15, wherein the maximum SFN-MCCH-Offset is 4096 frames.

23. The method of claim 15, wherein the configuration information is transmitted to the mobile terminal periodically.

24. The method of claim 15, wherein the configuration information is transmitted to the mobile terminal as a system information message on a logical channel broadcast control channel (BCCH).

25. The method of claim 15, wherein the configuration information is transmitted to the mobile terminal as a point-to-multipoint control message on a logical channel MCCH.

26. The method of claim 15, wherein the configuration information is transmitted to the mobile terminal on a dedicated channel.

27. The method of claim 15, wherein the configuration information is MCCH scheduling information.

28. The method of claim 15, wherein the configuration information is transmitted to the mobile terminal in a system information message and a point-to-multipoint control message.

* * * * *